United States Patent [19]
Laewen et al.

[11] Patent Number: 5,467,193
[45] Date of Patent: Nov. 14, 1995

[54] TARGET DEVICE AND USE THEREOF FOR ALIGNING LIGHT BEAMS UTILIZING CROSS-HAIR LIGHT BEAMS

[76] Inventors: Arne H. Laewen, 437 Tweedsmuir Avenue, Ottawa, Ontario, K1Z 5N8; Stephen W. Busby, R.R. 1, Oxford Mills, Ontario, K1G 1S0, both of Canada

[21] Appl. No.: 287,247

[22] Filed: Aug. 8, 1994

[51] Int. Cl.[6] ............................................. G01B 11/00
[52] U.S. Cl. ........................ 356/399; 356/400; 356/401; 250/491.1; 33/241
[58] Field of Search ........................................ 356/399, 400, 356/401, 153; 250/491.1; 33/241, 286

[56] References Cited

U.S. PATENT DOCUMENTS

| | | | |
|---|---|---|---|
| 3,614,238 | 10/1971 | Stites | 356/399 |
| 3,723,013 | 3/1973 | Stirland et al. | 356/400 |
| 4,123,660 | 10/1978 | Horwitz | 356/172 |
| 4,381,150 | 4/1983 | Curtis | 356/153 |
| 4,501,135 | 2/1985 | Chivens et al. | 356/373 |

*Primary Examiner*—Richard A. Rosenberger
*Assistant Examiner*—Robert Kim

[57] ABSTRACT

A target device is designed for use with a machine for treating a patient with radiation. The device enables accurate determination of an isocenter to which the radiation should be directed, the isocenter being at a point of intersection of at least three composite laser beams. The device enables the laser sets to be adjusted in position and their beams to be adjusted in direction in order to achieve improved accuracy in setting up the isocenter.

13 Claims, 5 Drawing Sheets

5,467,193

TARGET DEVICE AND USE THEREOF FOR ALIGNING LIGHT BEAMS UTILIZING CROSS-HAIR LIGHT BEAMS

FIELD OF THE INVENTION

The invention relates to a target device for use in aligning a plurality of light beams (usually at least three and usually laser beams) that extend in different directions towards a common point in space (known as an isocenter). The purpose of the procedure is to define this point more accurately, and the invention also relates to this procedure.

BACKGROUND OF THE INVENTION

Laser emitters are widely used preparatory to radiation treatment of a patient for accurately positioning a target area on the patient relative to the isocenter of a radiotherapy machine. This use of the target device is an important application of the present invention, although it is not the only one. The target device can be used in other situations in which there is a requirement to align a plurality of beams from lasers or other light emitters to cause them to converge at an isocenter.

In the medical application referred to above, namely when the invention is used in conjunction with radiotherapy equipment, there are typically four light sources, e.g. laser sets. One laser set is mounted on each of two opposite walls of the room in which the equipment is located, and they are oriented to direct composite beams horizontally towards each other. These are referred to as the lateral laser sets. A third laser set is mounted on the ceiling and directs its composite beam downwardly. Ideally, the three sets of beams should intersect in space to define the isocenter. The fourth laser, called the saggital laser, is mounted on a third wall of the room at an elevated location, and directs its single beam towards the isocenter at right angles to the two lateral composite beams coming from the wall mounted laser sets.

The composite beam from each of the lateral and ceiling laser sets consists of two intersecting portions, each portion being a narrow strip. The two strips are perpendicular to each other, one strip being horizontal and the other vertical. The two beam portions thus define a cross. In the case of the ceiling laser set, the two strips are both horizontal. The single beam from the saggital laser consists of only one portion, namely a vertical strip.

The beams are visible to the operator and are designed to meet and display a cross on a common target.

The foregoing procedure is known in the art, but the prior art devices for achieving alignment of the beams to define the isocenter have suffered from inaccuracies. They have generally relied on use of a pair of right-angled wires (crosshairs) that project a shadow image of a cross on whatever target is used. A problem when depending on these crosshairs is that on some radiotherapy machines they are mounted on a removable tray that slides in and out with provision for adjusting its position in the X and Y directions (the two horizontal directions). Since the prior art laser alignment devices have depended on proper crosshair alignment in the initial set up, if the crosshairs are in fact not correctly aligned, the lasers will also lack proper alignment. Another problem is that correct alignment of the crosshairs depends on the operator's visual dexterity. In addition, the alignment checks are performed sequentially, each subsequent check requiring a new set up.

Yet another problem of the prior art alignment techniques resides in the fact that, even assuming that all the beams accurately intersect at the isocenter, there is no guarantee that they are accurately directed relative to each other, which is a requirement of a perfect set up. Specifically, the two lateral beams should together define a single straight line and the ceiling beam should be at right angles to the lateral beams.

SUMMARY OF THE INVENTION

The main object of the present invention is to provide apparatus and method for overcoming these shortcomings of the prior art, i.e. apparatus and method for increasing the accuracy of determining an isocenter in a manner requiring a minimum of set up time while avoiding multiple set ups.

To this end, in one aspect the invention provides a target device for use in orienting a plurality of composite beams emitted by respective light sources, the beams extending in mutually different directions towards an isocenter and each beam having a cross-section comprising a pair of strips intersecting each other. The device comprises (a) a primary member, e.g. a block, having at least one surface inscribed with crosshairs, and (b) a secondary member, e.g. an arm mountable on the primary member and including at least one plate inscribed with crosshairs and having a hole centered on such crosshairs. The secondary member is so mountable on the primary member that the plate is positioned along a beam at a location spaced towards the source of the beam away from the inscribed surface of the primary member whereby this surface receives a central portion of the beam that has passed through the hole, and the portion of the plate surrounding the hole receives an outer portion of the beam.

The invention also provides a method of aligning three such composite light beams to intersect at an isocenter. The method comprises directing each beam onto a plate inscribed with crosshairs while passing a portion of the beam through a hole in the plate, which hole is centered on the crosshairs. The portion of the beam passing through the hole impinges on a surface spaced beyond the plate that is also inscribed with crosshairs. The method includes adjusting the location and direction of each beam to cause the strips of the beam to coincide with the crosshairs on both the plate and the surface beyond the hole in the plate.

The most likely practical application of the invention resides in a method of determining an isocenter for alignment with a target area on a patient to be treated with radiation. As before, the isocenter is defined by a point of intersection of three composite laser beams. The method includes using a device according to the invention by directing each beam from one of three locations approximately at right angles to each other onto a plate of the secondary member while passing the beam through the hole in a plate of the secondary member. The portion of the composite beam that passes through the hole impinges on an inscribed surface of the primary member spaced beyond the plate. The method includes adjusting the location and direction of each composite beam to cause its strips to coincide with the crosshairs on both the plate and the inscribed surface beyond. A fourth beam having a single strip is directed from a fourth location onto inscribed surfaces of both the primary and secondary members. The location and direction of the fourth beam are adjusted to cause its strip to coincide with inscribed lines on both the primary and secondary members.

DETAILED DESCRIPTION OF THE PREFERRED EMBODIMENT

Figure 1:
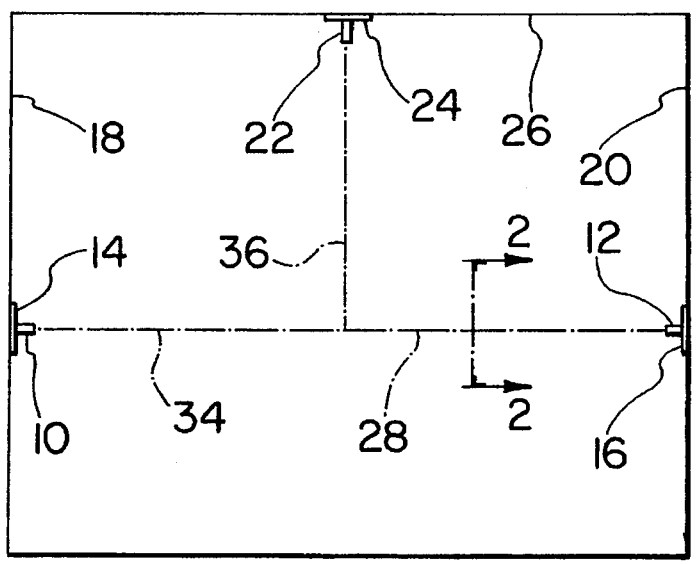
FIG. 1 is a simplified view of the arrangement of three lasers located on opposite walls and the ceiling of a radiation treatment room, the radiation equipment being omitted in this view for clarity.

FIG. 1 shows lateral laser sets 10 and 12 mounted by support devices 14 and 16 on opposite walls 18 and 20 of a room in which radiotherapy equipment is to be located. A ceiling laser set 22 is mounted by a support device 24 on the ceiling 26. All the support devices 14, 16 and 24 are capable of adjusting their respective laser sets (and hence their beams) for translation in two dimensions—horizontally and vertically in the case of the lateral laser sets, and in two horizontal dimensions in the case of the ceiling laser set. These support devices also provide for rotational adjustment of their laser sets about two axes so that their beams can be caused to vary their direction of travel in any desired way. Such support devices are known in the art and hence require no further detailed description. The saggital laser is not shown in FIG. 1, but will be further described below.

Figure 2:
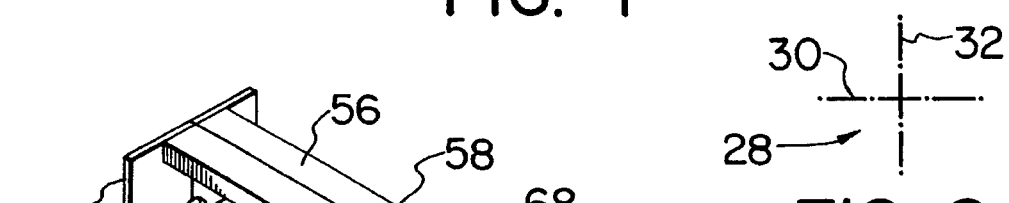
FIG. 2 is a section on the line 2—2 in FIG. 1.

FIG. 2 shows the cross-section of a composite beam 28 from the laser set 12, this beam 28 consisting of a horizontal strip 30 and a vertical strip 32. Each of the laser sets 10, 12 and 22 contains two separate lasers, one providing the horizontal strip 30 and the other the vertical strip 32. Beams 34, 36 from the laser sets 10 and 22 are similar.

Figure 3:
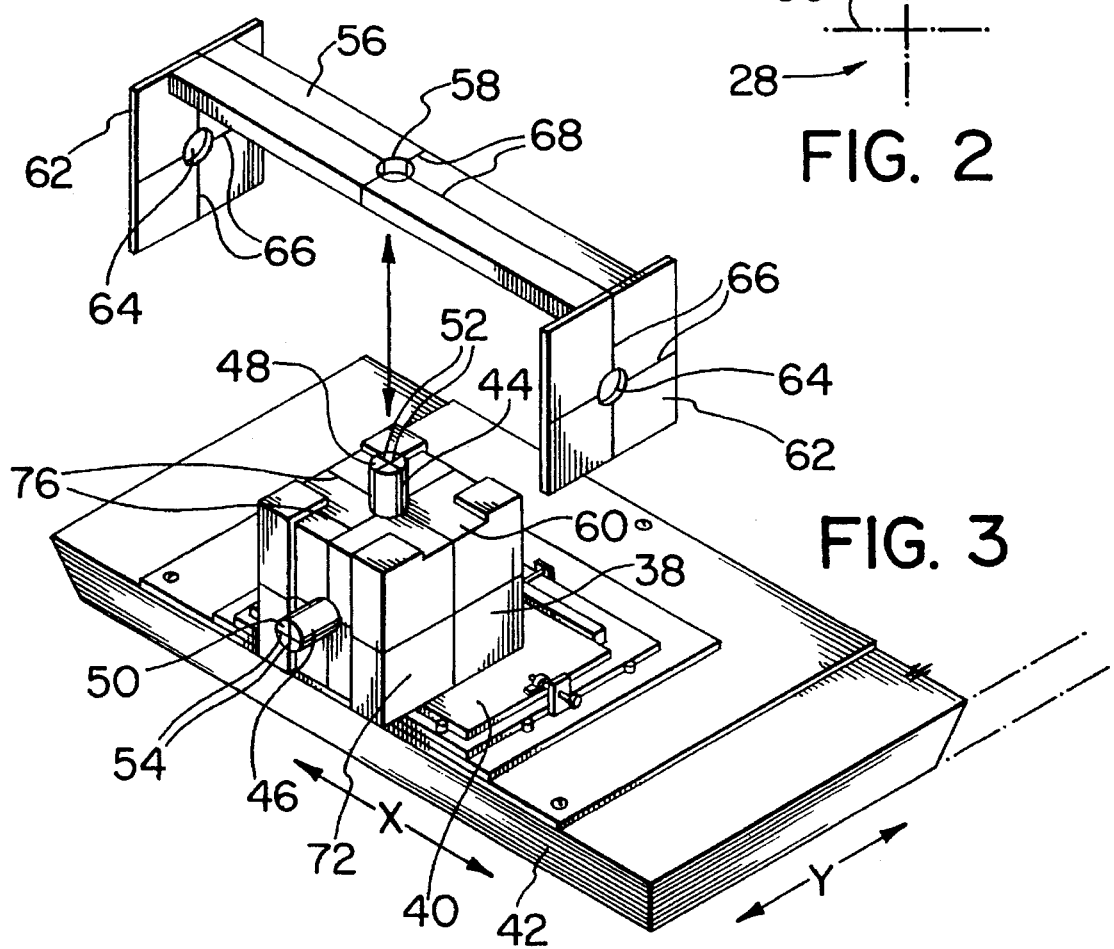
FIG. 3 is an exploded perspective view of a target device in accordance with a preferred embodiment of the present invention.

FIG. 3 shows a target device that includes a primary member in the form of a cubic block 38 mounted on a support device 40 that provides for adjustment of the block 38 relative to a table 42. This adjustment can take the form of movement in either or both of the horizontal (X and Y) directions. The support device 40 also has provision for levelling the block 38 and for rotating the block 38 about a vertical axis in order to ensure its correct orientation in space regardless of any inaccuracies of the location and orientation of the table 42.

The block 38 has two cylindrical pins 44 and 46, the former defining a vertical axis and the later a horizontal axis. The end faces 48, 50 of the pins 44, 46 are inscribed, e.g. etched, with crosshairs 52, 54. The two portions of the crosshairs 52 extend at right angles to each other in the horizontal plane, while those of the crosshairs 54 extend horizontally and vertically.

Figure 4:
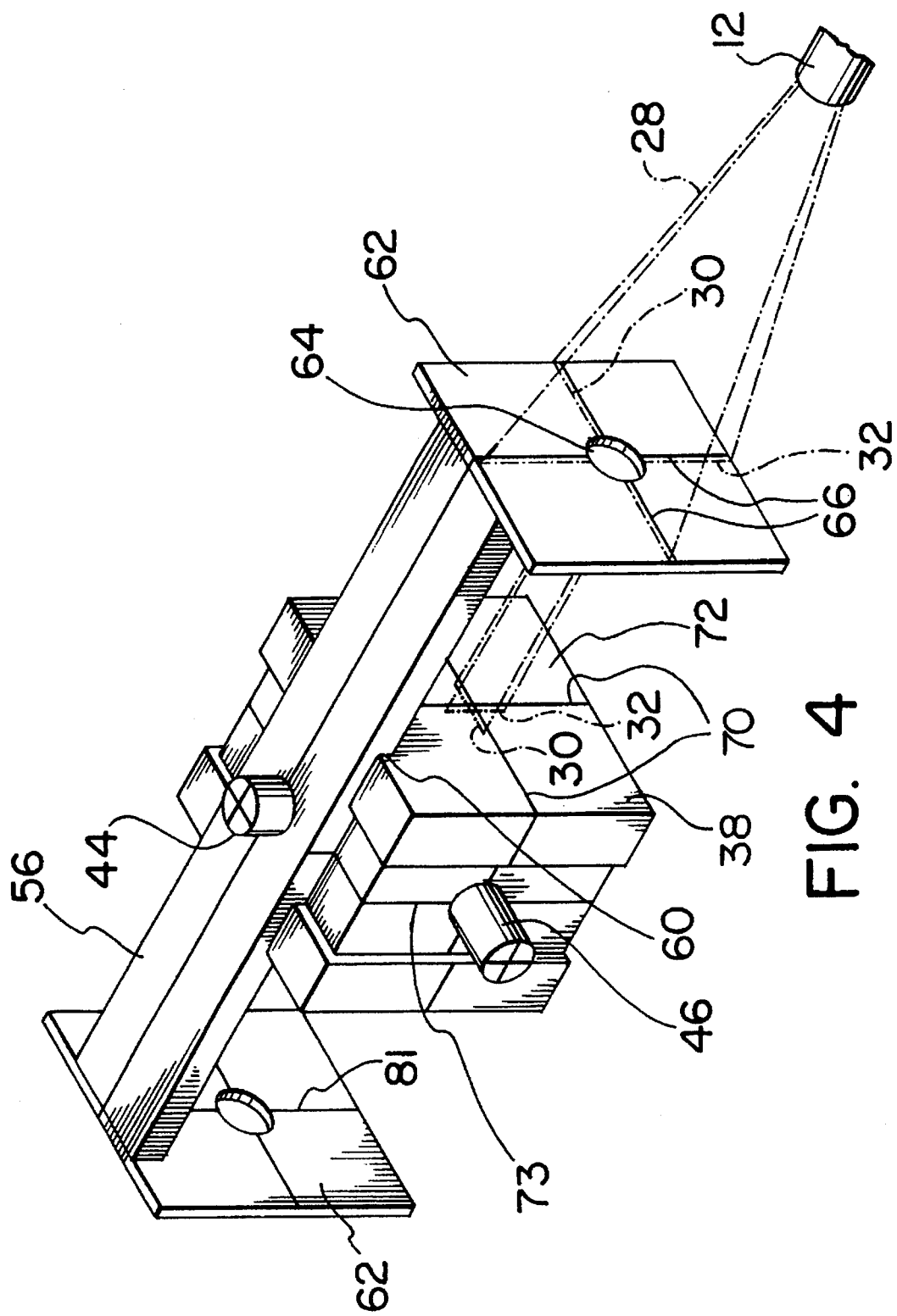
FIG. 4 is a perspective view of the device of FIG. 3 illustrating its method of use.

A secondary member of the target device takes the form of an arm 56 that has a central hole 58 dimensioned to receive the pin 44 as shown in FIG. 4. The block 38 has slots 60 in its upper surface to hold the arm 56 firmly in transverse position. At each end of the arm 56 there is a depending plate 62 which has a central hole 64 and a pair of crosshairs 66 inscribed on its inner and outer surfaces, the center of each hole 64 coinciding with the intersection point that would be defined by the crosshairs 66 if the hole were not there. In a similar manner the upper surface of the arm 56 has inscribed crosshairs 68 centered on the hole 58.

With the target device assembled, as shown in FIG. 4, the composite beam 28 from the laser 12 is directed against the outer surface of one of the plates 62. Assuming some initial misalignment, the beam strips 30, 32 will not exactly coincide with the crosshairs 66 in the plate 62 surrounding the hole 64. A central portion of the beam 28 will pass through the hole 64 and illuminate the side 72 of the block 38 which is also inscribed with crosshairs 70. Again it is assumed in FIG. 4 that the beam strips 30, 32 fail to coincide with these crosshairs 70. To achieve alignment the support device 16 on which the laser 12 is mounted is adjusted until the beam strips 30, 32 coincide with both the crosshairs 66 and the crosshairs 70. This adjustment not only ensures that the beam 28 is accurately directed towards the isocenter (the center of the block 38), but also that the beam 28 is travelling exactly perpendicularly to the side 72 of the block 38.

A similar alignment procedure is carried out at the other end of the arm 56 with the composite beam 34 from the laser set 10, the location and orientation of the laser set 10 being adjusted by means of its support device 14. The arm 56 need not necessarily have two end plates 62, although this arrangement provides better balance. If it has only one plate 64, it is turned through 180° on the pin 44 to align the second lateral beam.

Figure 5:
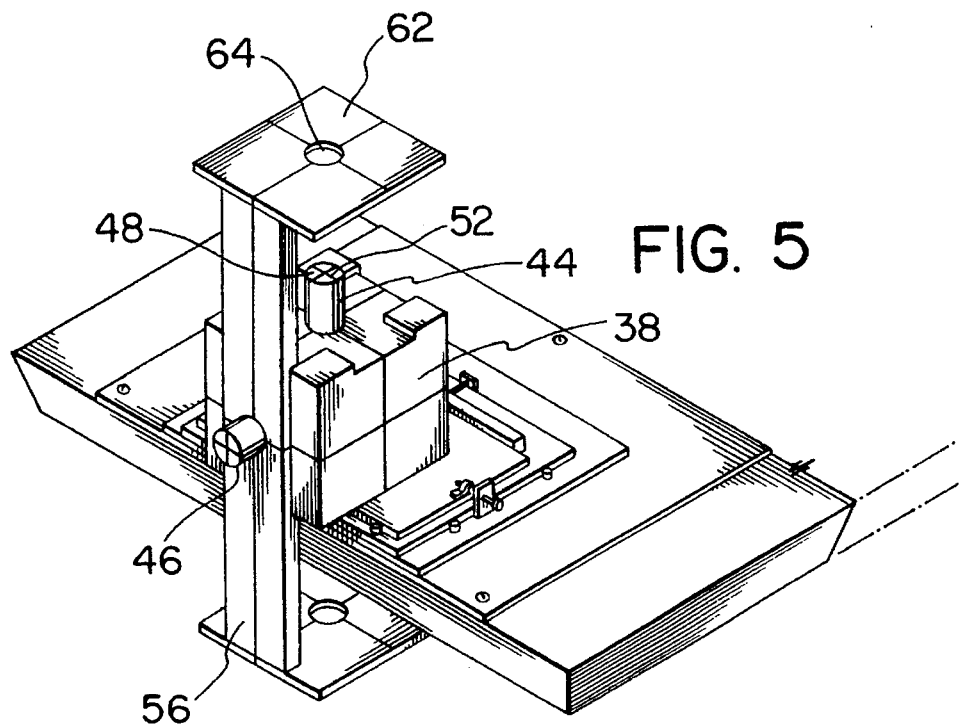
FIG. 5 shows a variant of FIG. 4.

To align the location and orientation of the ceiling laser set 22, the arm 56 is removed from the vertical pin 44 and placed on the horizontal pin 46 so that it extends vertically as shown in FIG. 5. In this vertical orientation of the arm 56, the composite beam 36 from the ceiling laser set 22 first encounters the plate 62 in the same manner as in FIG. 4, while its central portion which passes through the hole 64 encounters the end face 48 of the pin 44 for alignment with the crosshairs 52. Since the block 38 is so made that the axes of the pins 44, 46 intersect each other accurately at right angles at the center of the block, this center becomes the isocenter.

To explain how the target device can be utilized, it will be easiest if it is explained in a situation where a new treatment machine has been installed, but the laser sets have not yet been mounted at their respective locations.

Figure 6:
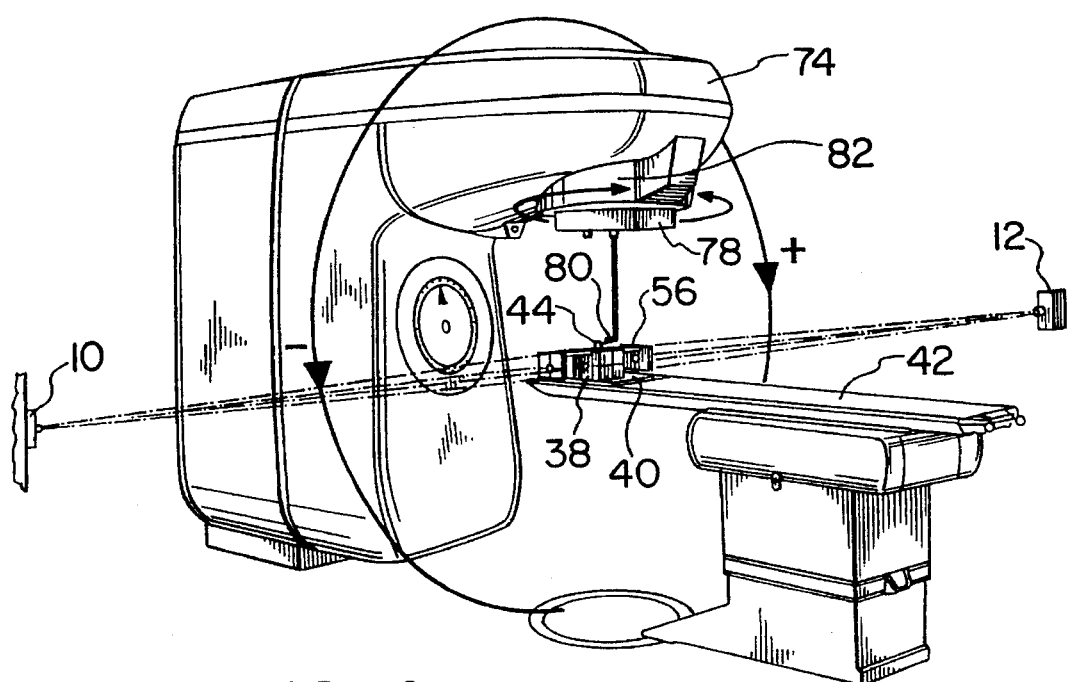
FIG. 6 is a perspective view illustrating generally the method of use of the target device in association with radiation equipment.
Figure 7:
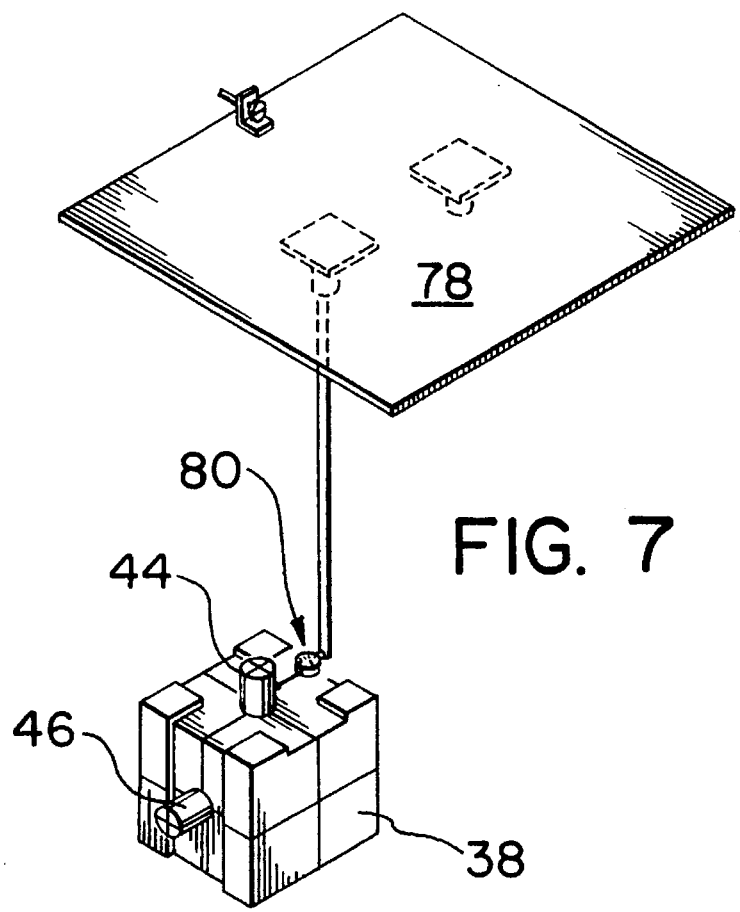
FIG. 7 shows a fragment of the equipment.

The target block 38 is placed near the front of the treatment table 42 so that the horizontal pin 46 extends past the table edge. See FIG. 6. With the treatment machines gantry 74 at 0°, a field light in the collimator is turned on. The field light projects an area of light onto the patients body surface, which geometrically mimics the surface area of the treatment beam. The position of this light source (a filament lamp) is adjustable to make the light beam symmetrical with respect to the axis of rotation of the gantry. The block 38 can then be moved on the table 42 to come under a crosshair shadow provided by the field light so that the etched lines 76 on the top of the block align with the projected shadow. This procedure is conventional. It should be noted that the target arm 56 has not yet been attached. Once the block has been so aligned, the next step is to level it in both the X and Y directions using levelling screws associated with the support device 40 and a spirit or digital level. The field light can then be turned off. The next step is to slide a tray 78 with an indicator 80 into treatment rails of the collimator 82 of the machine. The indicator 80 is positioned so that it just comes into contact with the vertical pin 44 (FIG. 7). The collimator 82 is rotated, which in turn rotates the indicator 80 around the pin 44. The block 38 is adjusted by fine adjustment X and Y screws in the support device 40 until the centre of the pin 44 is in direct line with the centre of the axis of rotation of the collimator 82. Next, the horizontal pin 46 is aligned in the same manner, except that in this case the gantry is rotated by 90° and the horizontal pin 46 is centralized with the centre of the gantry's axis. To accomplish this it may be necessary to adjust the height of the treatment table 42. It may also be necessary to rotate the block 38 by means of adjustment screws. This block rotation does not affect the position of the vertical pin 44 because the rotational axis is centred with this vertical pin. When both pins are exactly aligned the exact centre of the cubic block 38 becomes the mechanical isocenter.

The target arm 56 is now installed on top of the block 38 (FIG. 6), and the lateral laser sets are positioned on their respective mounting devices. They are turned on and beamed onto the target plates 62. The composite beams must project onto the crosshairs etched on the target plates 62 as well as on the target surfaces 72 of the block. The correct positions of the aligned laser sets can now be recorded.

Figure 8:
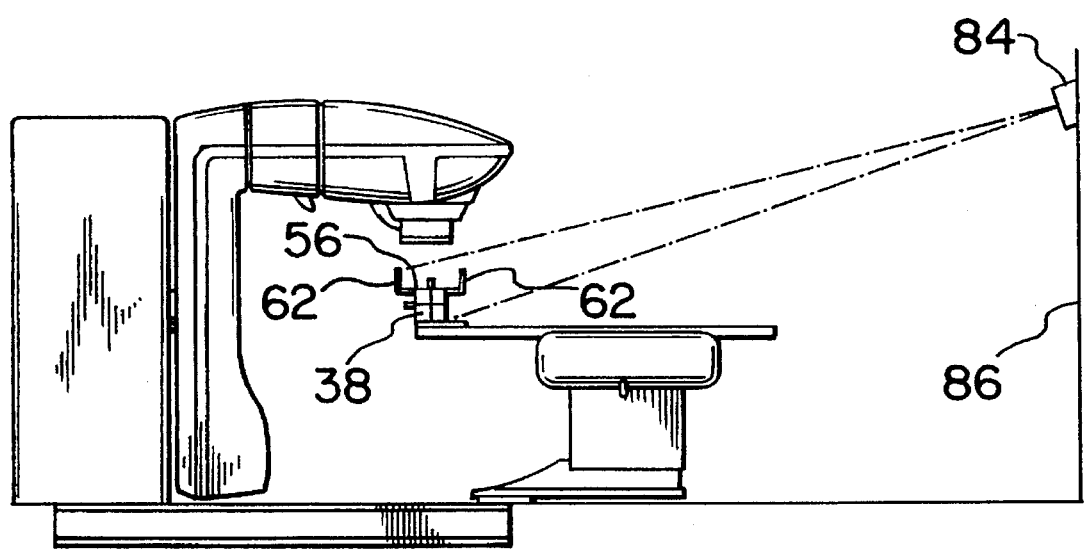
FIG. 8 is a side view showing a further stage in the alignment process.

The target arm 56 is then positioned with the target plates 62 pointing upwards (FIG. 8). The sagittal laser 84, which is mounted on the wall 86 in front of the radiotherapy machine between the walls 18 and 20, is now employed. The saggital laser beam is a single strip longitudinally along the table 42 directly in line with the isocenter. The purpose of this single plane laser is to provide for the fact that, when the gantry is in its upright position, (0°) it completely blocks the ceiling laser. The saggital laser then becomes the sole longitudinal reference and its vertical strip is aligned both with a vertical inscription 73 on the block 38 and a vertical inscription 81 on an inside surface of an end plate 62 (see FIG. 4), when the arm 56 is in the orientation shown in FIG. 8. In the same manner one of the two lateral lasers is blocked when the gantry is in the 90 or 270 degree position. The ceiling laser then becomes the sole reference in the Y axis. This is an important reason for the present invention. With so many lasers converging to a point it has been difficult and time consuming to insure that every laser line is perfectly aligned.

The final laser set to be aligned is on the ceiling. The gantry must be rotated out of the way of the vertical composite beam so that it can project onto the target device. The arm 56 is attached in the vertical orientation, as mentioned above, and the alignment procedure is carried out in the same manner as described with the lateral laser sets.

After all the laser sets have been correctly aligned, the crosshair wires against which the operator initially aligned the target device can be checked and repositioned if necessary. This is accomplished by first bringing the gantry back to 0°, turning on the field light and projecting the crosshair shadows onto the target device. The crosshairs must project onto the etched lines of the plate 62 as well as those of the inscribed surface of the target block beyond the plate 62 to be in correct alignment.

Figure 9:
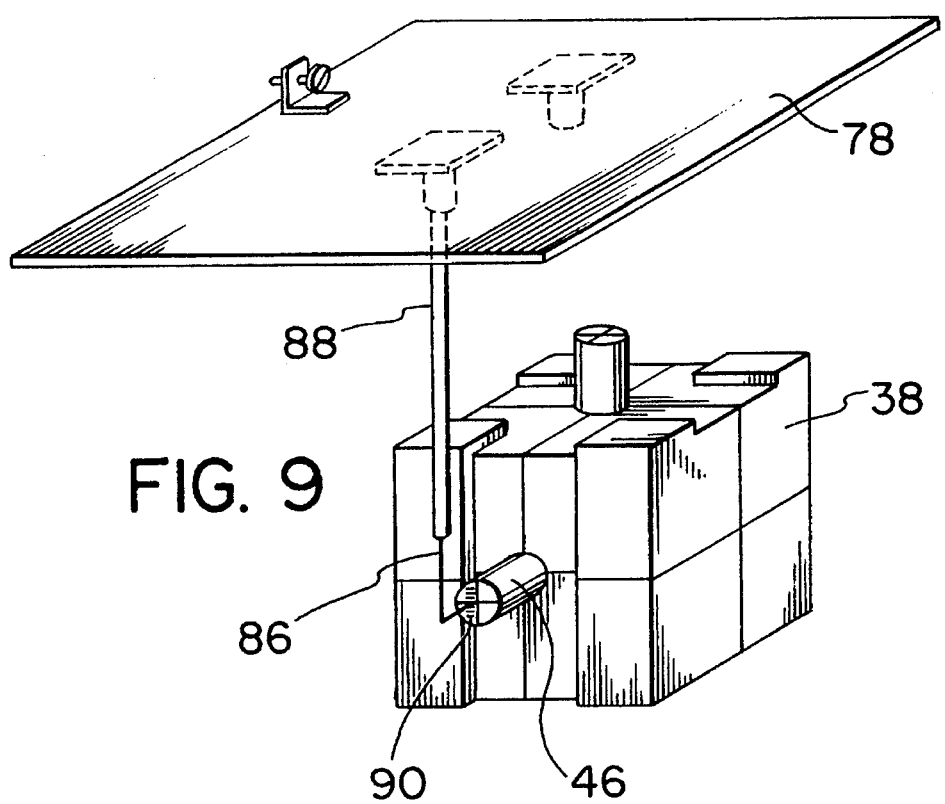
FIG. 9 shows another fragment of the equipment.

The last check to be performed is gantry sag. This is done with the arm 56 removed. The gantry is rotated to 0° and the indicator tray 78 is put back into the collimator 82 without the indicator 80. A right angled pointer 86 is mounted on the indicator arm 88 (FIG. 9). The tip of the pointer 86 is positioned at the exact centre of the vertical pin 46. The gantry is then rotated to 90°. The pointer 86 will still be on the vertical etched line on the pin 46, but will move down from the horizontal line. The distance the pointer tip moves is the sag measurement and can be read on a scale 90 provided on the end face of the pin 46. The gantry is then rotated to 270° and a reading on the scale is taken again.

Figure 10:
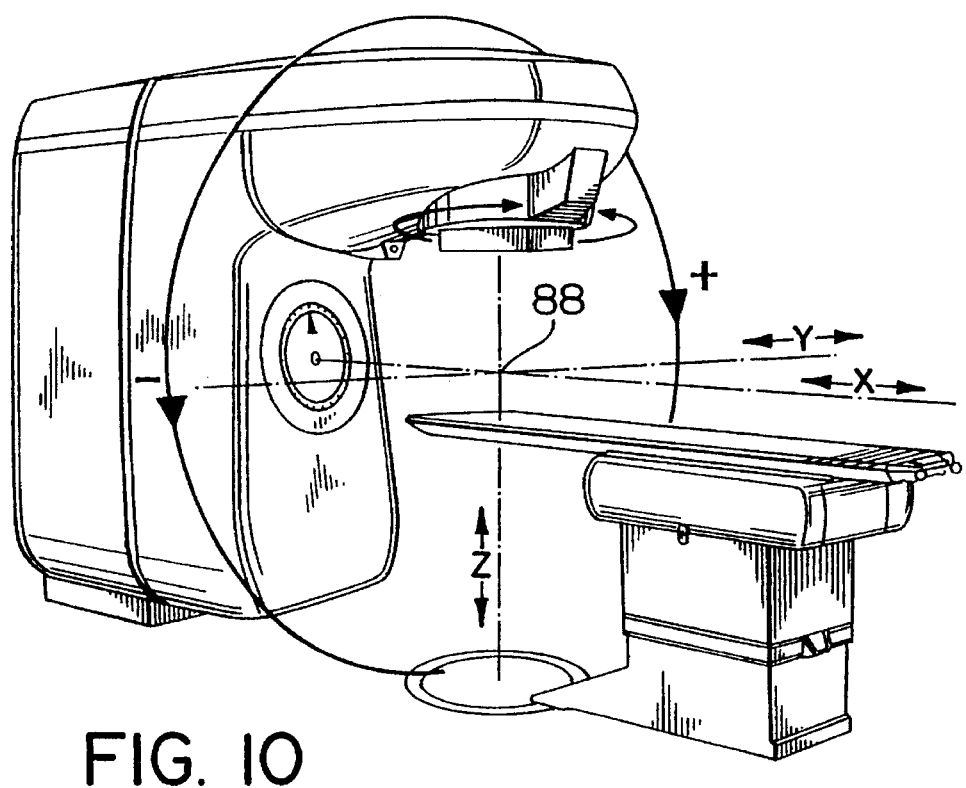
FIG. 10 is a view similar to FIG. 6.

FIG. 10 illustrates the exact point 88 on which the block must be centered. It must also be properly oriented in the X, Y and Z directions.

As indicated above, while the preferred form of light source is a laser, the invention is also applicable to use with collimated incandescent light sources.

Also, the invention is not limited to the determination of an accurate isocenter for a radiotherapy or like machine. The invention can be used for the determination of an isocenter defined by a plurality of light beams, regardless of the use to which this isocenter is put.

We claim:

1. A target device for use in orienting a plurality of composite beams emitted by respective light sources, said beams extending in mutually different directions towards an isocenter and each beam having a cross-section comprising a pair of strips intersecting each other; wherein the device comprises (a) a primary member having at least one surface inscribed with crosshairs, and b) a secondary member mountable on the primary member and including at least one plate inscribed with crosshairs and having a hole centered on such crosshairs, the secondary member being so mountable on the primary member that the plate is positioned along a said beam at a location spaced towards the source of the beam away from the inscribed surface of the primary member whereby said surface receives a central portion of the beam that has passed through the hole, and a portion of the plate surrounding the hole receives an outer portion of the beam.

2. A target device for use in orienting three composite beams emitted by respective light sources, a first two of said beams extending substantially horizontally towards each other and towards an isocenter and the third beam extending perpendicularly to the first two beams and towards the isocenter, each beam having a cross-section comprising a pair of strips intersecting each other; wherein the device comprises (a) a primary member having three surfaces inscribed with crosshairs, each such surface facing one of the light sources, and (b) a secondary member comprising an arm mountable on the primary member and a plate inscribed with crosshairs mounted on each end of the arm with each plate having a hole centered on said crosshairs, and means for mounting the secondary member on the primary member in such a position that each plate is positioned along a respective one of the first two beams at a location spaced towards the sources of the beam away from one of the inscribed surfaces of the primary member whereby the latter inscribed surface receives a central portion of said one beam that has passed through the hole, and a portion of a said plate surrounding the hole receives an outer portion of said one beam.

3. A target device according to claim 2, including means for mounting the secondary member on the primary member in a further position such that one of the plates is positioned along the third beam at a location spaced towards the source of the third beam away from an inscribed surface of the primary member whereby such inscribed surface receives a central portion of the third beam that has passed through the hole in said plate, and a portion of the plate surrounding the hole receives an outer portion of the third beam.

4. The target device in accordance with claim 2 in combination with three laser sets constituting said light sources.

5. A method of aligning three composite light beams to intersect at an isocenter, each beam having a cross-section comprising a pair of strips intersecting each other, said method comprising directing each beam onto a plate inscribed with crosshairs while passing a central portion of such beam through a hole in the plate, which hole is centered on the crosshairs, the central portion of the beam passing through the hole impinging on a surface spaced beyond the plate that is also inscribed with crosshairs, and adjusting the location and direction of each beam to cause the strips of the beam to coincide with the crosshairs on both a portion of the plate surrounding the hole and the surface beyond the hole in the plate.

6. A method according to claim 5, wherein the surfaces on which the respective beams impinge are formed on three faces of a cubic block.

7. A method according to claim 6, wherein the beams are laser beams.

8. A method according to claim 6, including directing a fourth beam consisting of a single strip onto a selected surface of the block and adjusting the fourth beam to bring its single strip into coincidence with a line constituting part of a crosshair on said selected surface.

9. A method of determining an isocenter for alignment with a target area on a patient to be treated with radiation, said isocenter being defined by a point of intersection of three composite laser beams each having a cross-section comprising a pair of strips intersecting each other and a fourth laser beam comprising a single strip, said method comprising directing each composite beam from one of three locations approximately at right angles to each other onto a plate inscribed with crosshairs while passing a central portion of such composite beam through a hole in the plate, which hole is centered on the crosshairs, the central portion of the composite beam passing through the hole impinging on a surface spaced beyond the plate that is also inscribed with crosshairs, and adjusting the location and direction of each composite beam to cause its strips to coincide with the crosshairs on both a portion of the plate surrounding the hole and the surface beyond the hole in the plate in respect of each of the three composite beams, and directing the fourth beam from a fourth location to cause its strip to coincide with inscribed vertical lines on a plate and a surface.

10. A method according to claim 9, wherein two of the compsite beams are directed horizontally to the isocenter in directions opposite to each other, the third composite beam being directed to the isocenter vertically downwards.

11. A method according to claim 9, wherein, prior to said method of directing the beams to the isocenter, a preliminary alignment procedure is carried out, said preliminary alignment procedure comprising positioning and levelling a target device having said inscribed surfaces on a machine for treatment of the patient by means of a field light mounted on the machine.

12. A method according to claim 11, wherein the machine includes a gantry rotatable about a horizontal axis and a collimator rotatable about a vertical axis, the preliminary alignment procedure of positioning and levelling the target device being performed with the collimator and the gantry in different rotational orientations.

13. A system comprising (a) a source for emitting a composite light beam comprising a pair of strips intersecting each other, (b) a primary member having at least one surface inscribed with crosshairs, and (c) a secondary member mountable on the primary member and including at least one plate inscribed with crosshairs and having a hole centered on such crosshairs, the secondary member being so mountable on the primary member that the plate is positioned along said beam at a location spaced towards the source of the beam away from the inscribed surface of the primary member whereby said surface receives a central portion of the beam that has passed through the hole, and a portion of the plate surrounding the hole receives an outer portion of the beam.

* * * * *